US008928740B2

(12) United States Patent
Ito et al.

(10) Patent No.: US 8,928,740 B2
(45) Date of Patent: *Jan. 6, 2015

(54) IMAGE DISPLAY DEVICE, IMAGE DISPLAY VIEWING SYSTEM AND IMAGE DISPLAY METHOD

(75) Inventors: Atsushi Ito, Kanagawa (JP); Kyoichiro Oda, Kanagawa (JP)

(73) Assignee: Sony Corporation (JP)

( * ) Notice: Subject to any disclaimer, the term of this patent is extended or adjusted under 35 U.S.C. 154(b) by 579 days.

This patent is subject to a terminal disclaimer.

(21) Appl. No.: 12/928,470

(22) Filed: Dec. 13, 2010

(65) Prior Publication Data

US 2011/0149053 A1 Jun. 23, 2011

(30) Foreign Application Priority Data

Dec. 21, 2009 (JP) ................................ P2009-289463

(51) Int. Cl.
*G02B 27/22* (2006.01)
*G09G 3/00* (2006.01)
*H04N 13/04* (2006.01)
*G09G 3/34* (2006.01)
*G09G 3/36* (2006.01)

(52) U.S. Cl.
CPC ............ *G02B 27/2264* (2013.01); *G09G 3/003* (2013.01); *G09G 3/342* (2013.01); *G09G 3/3648* (2013.01); *H04N 13/0438* (2013.01); *H04N 13/0497* (2013.01); *G09G 2310/024* (2013.01); *G09G 2310/08* (2013.01); *G09G 2320/0242* (2013.01)
USPC .............................................. 348/56; 348/55

(58) Field of Classification Search
None
See application file for complete search history.

(56) References Cited

U.S. PATENT DOCUMENTS

| 7,348,952 B2 * | 3/2008 | Chang ............................ 345/87 |
| 7,400,308 B2 * | 7/2008 | Chang ............................ 345/76 |
| 7,477,206 B2 * | 1/2009 | Cowan et al. ..................... 345/6 |

(Continued)

FOREIGN PATENT DOCUMENTS

| CN | 1444076 A | 9/2003 |
| JP | 61-227498 A | 10/1986 |

(Continued)

OTHER PUBLICATIONS

Office Action from Japanese Application No. 2009-289463, dated Apr. 23, 2013.

(Continued)

*Primary Examiner* — Jay Patel
*Assistant Examiner* — Reza Aghevli
(74) *Attorney, Agent, or Firm* — Lerner, David, Littenberg, Krumholz & Mentlik, LLP

(57) ABSTRACT

An image display device includes a display panel that periodically displays different images, a shutter control portion that generates timing signals for driving shutters for a right eye and a left eye, in synchronization with the periodical display of the display panel, with respect to glasses for viewing images, the glasses being provided with the shutters for the right and left eye, a backlight that includes a light guide plate of a size corresponding to a display area of the display panel and light sources that are provided on two opposing side faces of the light guide plate and that irradiates the display panel from a rear side of the display panel, and a backlight control portion that causes the respective light sources that are provided on the two opposing side faces to blink at different timings during an opening period of the shutters.

11 Claims, 12 Drawing Sheets

(56) References Cited

U.S. PATENT DOCUMENTS

| | | |
|---|---|---|
| 8,162,482 B2* | 4/2012 | DeCusatis et al. ............. 353/7 |
| 2002/0044116 A1* | 4/2002 | Tagawa et al. ............. 345/87 |
| 2009/0198490 A1* | 8/2009 | Eckhart et al. ............. 704/215 |
| 2009/0237495 A1* | 9/2009 | Kawahara ............. 348/56 |
| 2011/0074935 A1* | 3/2011 | Ito et al. ............. 348/51 |
| 2011/0074937 A1* | 3/2011 | Nakahata ............. 348/56 |
| 2011/0074938 A1* | 3/2011 | Nakahata ............. 348/56 |
| 2011/0074939 A1* | 3/2011 | Ito et al. ............. 348/58 |

FOREIGN PATENT DOCUMENTS

| | | |
|---|---|---|
| JP | 2003262845 A | 9/2003 |
| JP | 3701355 A | 7/2005 |
| JP | 2008083427 A | 4/2008 |
| JP | 2009-025436 A | 2/2009 |
| JP | 2009-152897 A | 7/2009 |
| JP | 2012527831 A | 11/2012 |
| WO | 2009/069026 A2 | 6/2009 |
| WO | 2011028065 A2 | 3/2011 |

OTHER PUBLICATIONS

Office Action from Chinese Application No. 2010-10587569.4, dated Jan. 30, 2014.

* cited by examiner

IMAGE DISPLAY DEVICE, IMAGE DISPLAY VIEWING SYSTEM AND IMAGE DISPLAY METHOD

CROSS-REFERENCE TO RELATED APPLICATION

The present application claims priority from Japanese Patent Application No. JP 2009-289463 filed in the Japanese Patent Office on Dec. 21, 2009, the entire content of which is incorporated herein by reference.

BACKGROUND OF THE INVENTION

1. Field of the Invention

The present invention relates to an image display device, an image display viewing system and an image display method.

2. Description of the Related Art

Recently, a technology such as that described in Japanese Patent No. 3701355, for example, has become known that displays a plurality of video images on a single screen in a time-division manner and that uses a pair of glasses with shutters that are synchronized to the timing of the displayed images in order to separate the plurality of the video images and recognize them individually. A technology such as that described in Japanese Patent Application Publication No. JP-A-61-227498 is also known that makes it possible to create a stereoscopic display by utilizing the aforementioned technology to display parallax images that respectively correspond to the left and right eyes.

SUMMARY OF THE INVENTION

These two technologies are substantially the same in terms of hardware, and they differ only in the video content they display and the operating of the shutters. That is, if the shutters that respectively correspond to the left and right eyes open and close in the same phase, the plurality of the video images can be selectively displayed, and if the shutters open and close in opposite phases, such that the two images serve as parallax images, the stereoscopic image can be displayed.

Incidentally, in the case of a hold-type display device such as a liquid crystal display, since a screen is normally rewritten sequentially from an upper section of the screen, when the shutters provided in a pair of glasses open while scanning is performed within the screen, a problem arises in which two images before and after the rewriting look as if they are overlapped.

A method for opening the shutters within a time period called a blanking period is described in Japanese Patent Application Publication No. JP-A-2009-152897, the blanking period taking place after the scanning within the screen is completed and before the scanning of a next screen is started. However, in this method, with respect to a lower section of the screen, the shutters open immediately after the scanning. Since a response speed of liquid crystal is finite in an actual liquid crystal display, a display is not fully changed into a new screen in the lower section of the screen. As a result, the shutters open in a state in which a previous screen still remains, and a problem arises in which right and left images are displayed in a mixed manner particularly in the lower section of the screen.

Further, in Japanese Patent Application Publication No. JP-A-2009-25436, it is proposed that the same screen should be written twice by driving the liquid crystal display, for example, twice as fast as normal, and the shutters should be opened within a second scanning period. However, in this case, it is necessary to operate the liquid crystal display twice as fast as normal, and a significant cost increase becomes inevitable, due to, for example, an increase in frame memory etc.

In light of the foregoing, it is desirable to provide a novel and improved image display device, image display viewing system and image display method that are capable of reliably preventing a plurality of periodically displayed images from being visually perceived in a mixed manner, while maintaining a simple structure.

According to an embodiment of the present invention, there is provided an image display device includes a display panel that periodically displays a plurality of different images, a shutter control portion that generates timing signals for driving shutters for a right eye and a left eye, in synchronization with the periodical display of the display panel, with respect to glasses for viewing images, the glasses being provided with the shutters for the right eye and the left eye, a backlight that includes a light guide plate of a size corresponding to a display area of the display panel and light sources that are provided on two opposing side faces of the light guide plate and that irradiates the display panel from a rear side of the display panel, and a backlight control portion that causes the respective light sources that are provided on the two opposing side faces to blink at different timings during an opening period of the shutters.

In this configuration, the two side faces on which the light sources are provided are two side faces opposing a scanning direction of the display panel.

In this configuration, the light sources, which are provided on the two side faces, blink once respectively at separate timings during the opening period of the shutters, and a period exists when both of the light sources are turned off between lighting periods of the respective light sources.

In this configuration, at a point that is, from one of the two side faces in the scanning direction, one fourth of a distance between the two side faces, a luminance obtained when only the light source provided on one of the two side faces is lit is equal to or greater than four times as high as a luminance obtained when the light source provided on the other one of the two side faces is lit.

In this configuration, during the opening period of the shutters, the shutter control portion generates the timing signals for opening the shutters before a timing when the backlight opens.

According to another embodiment of the present invention, there is provided an image display viewing system includes an image display device and stereoscopic image viewing glasses. The image display device that includes a display panel that periodically displays a plurality of different images, a shutter control portion that generates timing signals for driving shutters for a right eye and a left eye, in synchronization with the periodical display of the display panel, with respect to glasses for viewing images, the glasses being provided with the shutters for the right eye and the left eye, a backlight that includes a light guide plate of a size corresponding to a display area of the display panel and light sources that are provided on two opposing side faces of the light guide plate and that irradiates the display panel from a rear side of the display panel, and a backlight control portion that causes the respective light sources that are provided on the two opposing side faces to blink at different timings during an opening period of the shutters. The stereoscopic image viewing glasses that are provided with the shutters for the right eye and the left eye and open and close the shutters for the right eye and the left eye based on the timing signals.

In this configuration, the shutters of the glasses for viewing images are arranged in front of the right eye and the left eye of a viewer respectively, and in response to switching between an image for the right eye and an image for the left eye that are periodically output from the image display device, the shutters are opened and closed to cause the image for the right eye to be incident to the right eye and to cause the image for the left eye to be incident to the left eye.

In this configuration, the shutters of the glasses for viewing images are arranged in front of the right eye and the left eye of the viewer respectively, and in response to switching between a plurality of different images that are periodically output from the image display device, the shutters are opened and closed to cause one of the images to be incident to both the right eye and the left eye.

According to another embodiment of the present invention, there is provided an image display method, comprising the steps of displaying a plurality of different images periodically, generating timing signals for driving shutters for a right eye and a left eye, in synchronization with the periodical display of a display panel, with respect to glasses for viewing images, the glasses being provided with the shutters for the right eye and the left eye, and causing respective light sources that are provided on two opposing side faces of a light guide plate of a backlight to blink at different timings during an opening period of the shutters, the backlight being provided with the light guide plate with a size corresponding to a display area of the display panel and the light sources that are provided on the two opposing side faces of the light guide plate.

According to the embodiments of the present invention described above, it is possible to reliably prevent a plurality of periodically displayed images from being visually perceived in a mixed manner, while maintaining a simple structure.

DETAILED DESCRIPTION OF THE EMBODIMENT(S)

Figure 1:
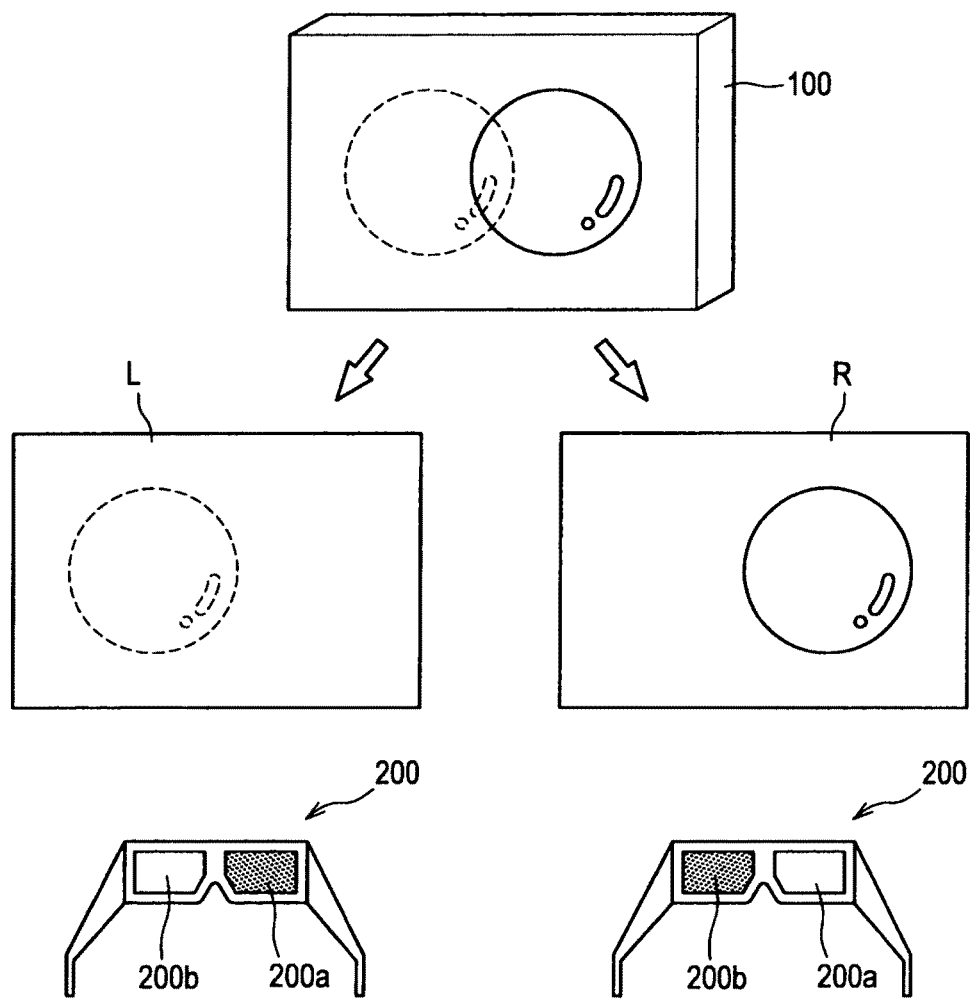
FIG. 1 is a schematic diagram that shows a configuration of a stereoscopic image display viewing system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that a description will be made in the following order.
1. First Embodiment
 (1) System configuration example
 (2) Configuration example of image display device
 (3) Configuration example of backlight
 (4) Example of image writing and backlight driving
 (5) Example of canceling differences in response speed of respective colors when driving backlight
 (6) Timing chart regarding control of shutters and backlight
2. Second Embodiment (Configuration Example of Reducing Effects Caused by Delay in Response of Shutters)
3. Third Embodiment (Example of Scan Lighting of Backlight)
4. Fourth Embodiment (Application to System that Periodically Displays a Plurality of Different Images)

1. First Embodiment
(1) System Configuration Example

FIG. 1 is a schematic diagram that shows a configuration of a stereoscopic image display viewing system according to an embodiment of the present invention. As shown in FIG. 1, the stereoscopic image display viewing system according to the present embodiment includes an image display device 100 that is formed by a liquid crystal display (LCD), and glasses 200 for viewing displayed images.

The image display device 100 is a stereoscopic image display device of a time-division type, for example, and alternately displays an image for a left eye and an image for a right eye on a full screen at very short intervals. Further, the image display device 100 provides images separately to the left eye and to the right eye, in synchronization with the display intervals of the image for the left eye and the image for the right eye. The image display device 100 alternately displays a parallax image for the right eye (image R for the right eye) and a parallax image for the left eye (image L for the left eye) for each field, for example. The glasses 200 for viewing displayed images (hereinafter also referred to as the viewing glasses 200) include a pair of liquid crystal shutters 200a and 200b at sections corresponding to lenses.

The image display device 100 includes an infrared light transmitting portion, and the viewing glasses 200 include an infrared light receiving portion. In the case of stereoscopic display, the image display device 100 displays the parallax image for the right eye and the parallax image for the left eye in a time-division manner. In order to prevent the user from detecting any flicker (flickering on the screen), it is preferable to set a display period for one image at a frequency equal to or greater than 60 Hz. In the case of the stereoscopic display, since left and right video images are alternately displayed, it is preferable to set a display period for one frame at a frequency equal to or greater than at least 120 Hz. In the present embodiment, the image L for the left eye and the image R for the right eye are alternately displayed at a frequency of 120 Hz.

The liquid crystal shutters 200a and 200b alternately perform an opening and closing operation in synchronization with image switching that is performed for each field of the image display device 100. More specifically, in a field in which the image R for the right eye is displayed on the image display device 100, the liquid crystal shutter 200b for the left eye is closed, and the liquid crystal shutter 200a for the right eye is open. On the other hand, in a field in which the image L for the left eye is displayed, a reverse operation to that described above is performed. In this manner, the image display device 100 alternately displays the image L for the left eye and the image R for the right eye on the full screen at very short intervals. At the same time, the image display device 100 provides the images separately to the left eye and to the right eye in synchronization with the display intervals of the image L for the left eye and the image R for the right eye.

With the above-described operations, only the image R for the right eye is incident to the right eye of a user who looks at the image display device 100 wearing the viewing glasses 200, and only the image L for the left eye is incident to the left eye of the user. As a result, inside the eyes of the viewer (user), the images for the right eye and the left eye are synthesized, and the image displayed on the image display device 100 is perceived stereoscopically.

Further, the image display device 100 can also display normal two dimensional images. In this case, switching between the image R for the right eye and the image L for the left eye is not performed. In addition, the user can visually perceive the two dimensional images without wearing the viewing glasses 200.

(2) Configuration Example of Image Display Device

Figure 2:
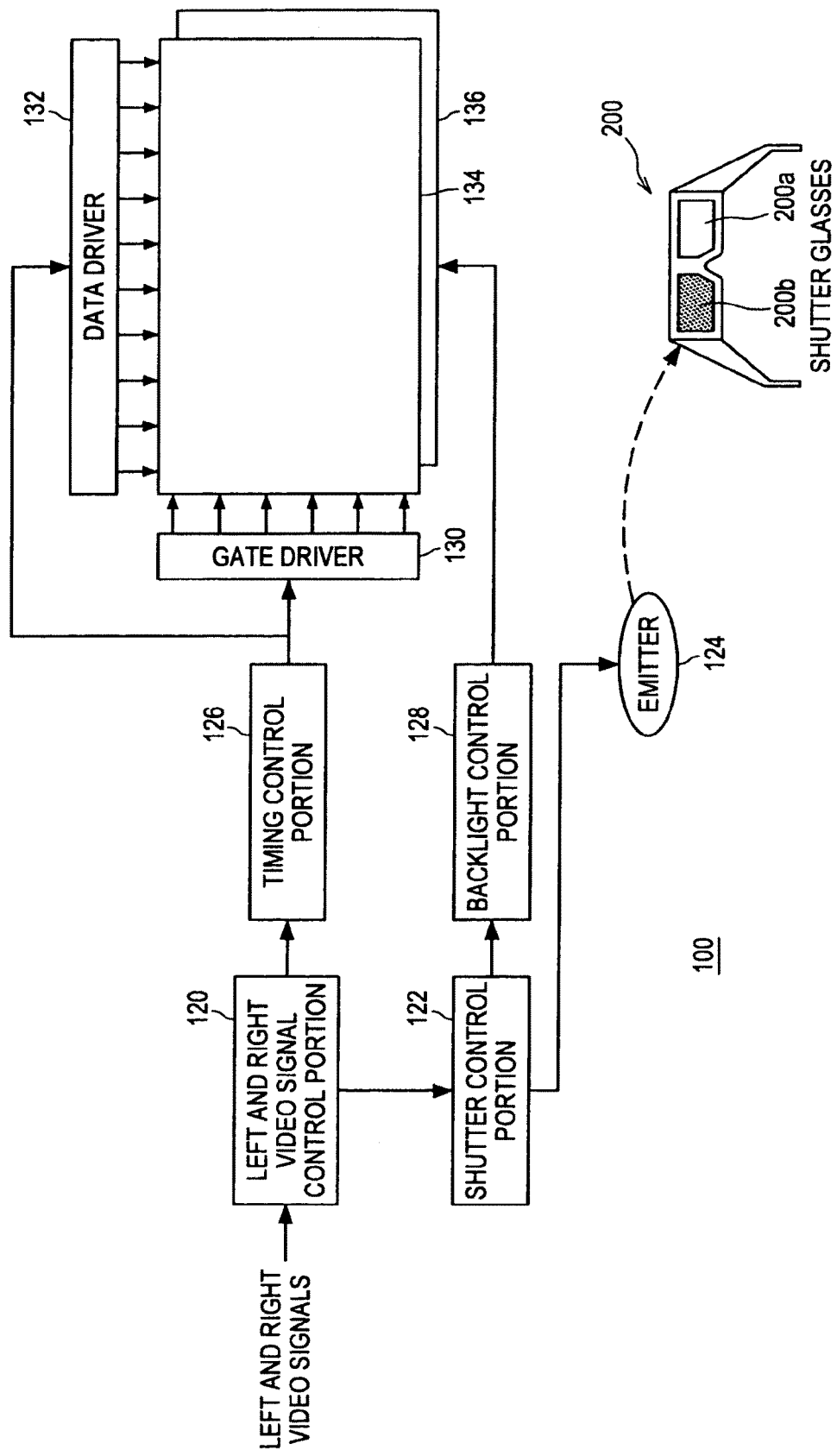
FIG. 2 is a block diagram that shows a configuration of an image display device.

Next, a configuration of the image display device 100 will be described. FIG. 2 is a block diagram showing the configuration of the image display device 100. As shown in FIG. 2, the image display device 100 is provided with a video signal control portion 120, a shutter control portion 122, an emitter 124, a timing control portion 126, a backlight control portion 128, a gate driver 130, a data driver 132 and a liquid crystal display panel 134. A backlight (a surface light source) 136 is arranged on a rear side of the liquid crystal display panel 134.

The liquid crystal display panel 134 includes a liquid crystal layer, transparent electrodes that face each other with the liquid crystal layer interposed therebetween, a color filter and the like. Further, the backlight 136 is formed with a light emitting diode (LED) with a good persistence characteristic etc.

Video signals to display the image R for the right eye and the image L for the left eye are input into the video signal control portion 120. The video signal control portion 120 alternately outputs a right eye video signal and a left eye video signal in order to alternately display the image R for the right eye and the image L for the left eye on the liquid crystal display panel 134.

The right eye video signal and the left eye video signal that are output from the video signal control portion 120 are input into the timing control portion 126. The timing control portion 126 converts the input right eye video signal and left eye video signal to signals to be input to the liquid crystal display panel 134, and generates pulse signals to be used for operations of the gate driver 130 and the data driver 132.

The signals converted by the timing control portion 126 are input into the gate driver 130 and the data driver 132, respectively. The gate driver 130 and the data driver 132 receive the pulse signals generated by the timing control portion 126, and cause each pixel of the liquid crystal display panel 134 to emit light based on the input pulse signals. As a result, video images are displayed on the liquid crystal display panel 134.

Further, the video signal control portion 120 transmits a timing signal (gate start pulse) to the shutter control portion 122. The timing signal indicates switching timings between the right eye video signal and the left eye video signal. Based on the timing signal transmitted from the video signal control portion 120, the shutter control portion 122 transmits to the emitter 124 a driving signal that causes the emitter 124 to emit light. Here, the driving signal that causes the emitter 124 to emit light is a signal that includes opening and closing timings of the liquid crystal shutters 200a and 200b, and the shutter control portion 122 controls the opening and closing timings of the liquid crystal shutters 200a and 200b based on the timing signal transmitted by the video signal control portion 120. Based on the driving signal transmitted from the shutter control portion 122, the emitter 124 transmits, to the viewing glasses 200, an optical signal (infrared signal) that indicates the opening and closing timings of the left and right liquid crystal shutters 200a and 200b.

Although details are omitted, the glasses 200 for viewing displayed images are provided with a sensor that receives the optical signal. When the sensor of the viewing glasses 200 receives the optical signal, the viewing glasses 200 alternately perform the opening and closing operation of the liquid crystal shutter 200a and the opening and closing operation of the liquid crystal shutter 200b, in synchronization with the opening and closing timings of the liquid crystal shutters 200a and 200b, the opening and closing timings being indicated by the optical signal.

Further, the shutter control portion 122 transmits the timing signal indicating the switching timings between the left and right video images to the backlight control portion 128. The backlight control portion 128 outputs a control signal to cause the backlight 136 to emit light based on the input timing signal. The backlight 136 emits light based on the control signal input from the backlight control portion 128.

Note that in the present embodiment, although the opening and closing timings of the liquid crystal shutters 200a and 200b are determined by the shutter control portion 122 of the image display device 100, the opening and closing timings of the liquid crystal shutters 200a and 200b may be controlled on the side of the viewing glasses 200, while the image display device 100 transmits only the switching timings between the left and right video images to the viewing glasses 200.

(3) Configuration Example of Backlight

Figure 3:
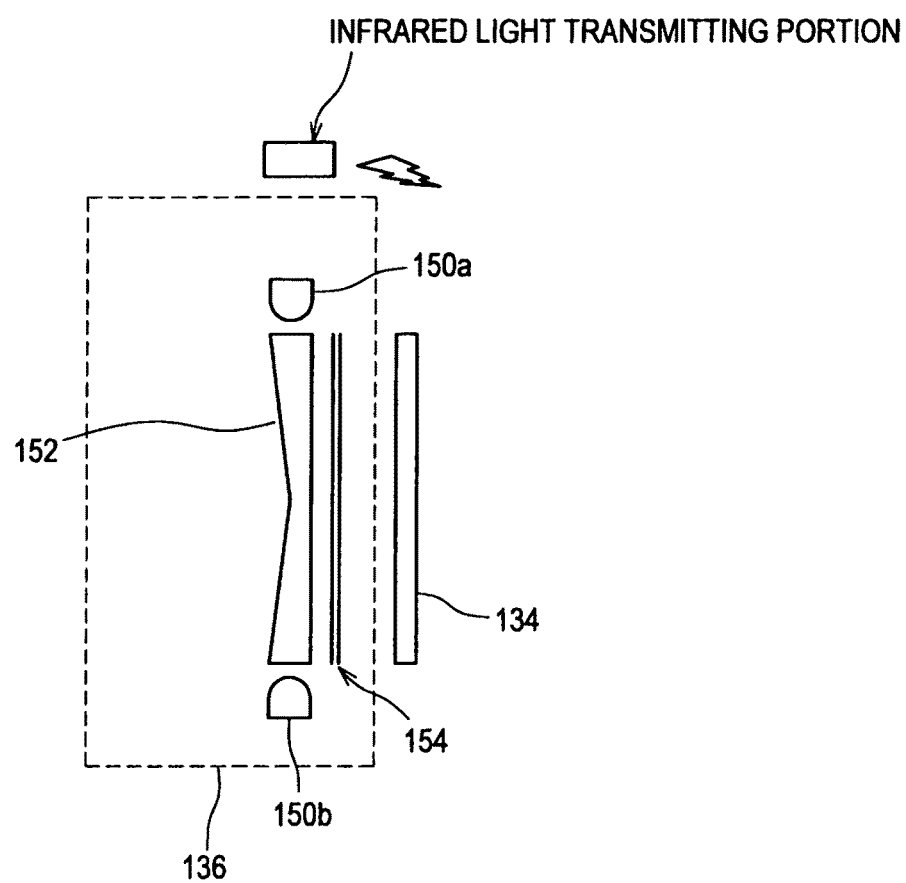
FIG. 3 is a schematic diagram that shows a configuration of a liquid crystal panel and its peripheral portions.

FIG. 3 is a schematic diagram that shows a configuration of the liquid crystal panel and its peripheral portions. As shown in FIG. 3, the backlight 136 is located on a rear side of the liquid crystal display panel 134. The backlight 136 includes light sources 150a and 150b, a light guide plate 152 and an optical sheet 154. As shown in FIG. 3, the light source 150a is located above the light guide plate 152, and the light source 150a irradiates the light guide plate 152 from an upper end face of the light guide plate 152. On the other hand, the light source 150b is located below the light guide plate 152, and the light source 150b irradiates the light guide plate 152 from a lower end face of the light guide plate 152. It is preferable to use fast-response LEDs as the light sources 150a and 150b, but the light sources 150a and 150b are not limited to the fast-response LEDs.

The light guide plate 152 is formed of a transparent resin such as an acrylic resin, and a cross-sectional surface of the light guide plate 152 is thicker at the upper and lower ends of the screen, while it becomes thinner toward the middle section of the screen. This structure of the light guide plate 152 enhances coupling efficiency of the light emitted from the light sources 150a and 150b. By using this type of the light guide plate 152, when the light source 150a provided on the upper section of the screen is lit, for example, only an upper half of the screen emits light strongly, and the light does not significantly reach a lower half of the screen. In a similar manner, when the light source 150b provided on a lower section of the screen is lit, for example, only the lower half of the screen emits light strongly, and the light does not significantly reach the upper half of the screen. Therefore, by performing switching operations of the upper and lower light sources 150a and 150b respectively, a light emitting surface of the backlight 136 can be made on either an upper half area of the screen or a lower half area of the screen. By using this type of structure, a light emitting area can be divided into upper half and lower half areas, while using only one sheet of the light guide plate 152. As a result, when the structure in which the light emitting area is divided is used, manufacturing costs can be minimized.

Note that, in the present embodiment, although the light emitting area of the backlight 136 is divided into the upper half and lower half areas based on a shape of the light guide plate 152, other methods may be used as long as they can divide the light emitting area into the upper half and the lower half of the screen. For example, other methods include, but are not limited to, an method of adjustment using a printing pattern and a printing density applied to the light guide plate 152, a method in which a microscopic shape is created on a surface of the light guide plate 152 and the shape or the density of the microscopic shape is controlled within the surface, a method in which two sheets of the light guide plates are arranged while being divided into the upper half and the lower half of the screen and a method in which two sheets of the light guide plates are stacked together in layers.

The optical sheet 154 is provided to lead the light toward the viewer (the light being emitted from the light guide plate 152 to the side of the liquid crystal display panel 134) such that light utilization efficiency is improved. However, a configuration in which the optical sheet 154 is not provided may also be used.

An infrared light transmitting device shown in FIG. 3 is a structural element corresponding to the emitter 124 shown in FIG. 2. The infrared light transmitting device is used to transmit a signal that drives the liquid crystal shutters 200a and 200b of the viewing glasses 200 in synchronization with switching of the screen. The infrared light transmitting device makes it possible to freely operate the liquid crystal shutters 200a and 200b by transmitting a signal of a specific pattern, for example, based on a vertical synchronization signal transmitted to the liquid crystal display panel 134.

An infrared light receiving device provided in the viewing glasses 200 receives infrared light transmitted by the infrared light transmitting device provided in the image display device 100, and transmits information to a circuit for driving the liquid crystal shutters 200a and 200b.

Note that in the present embodiment, although the infrared light is used for communication between the image display device 100 and the viewing glasses 200, any chosen wireless or wired communication, for example, can be used as long as the switching operation of the screen and the operation of the liquid crystal shutters 200a and 200b are synchronized.

The liquid crystal shutters 200a and 200b are, for example, twisted nematic liquid crystals sandwiched by polarization plates with orthogonally arranged polarization axes, and when a voltage is applied to transparent electrodes arranged at both sides of the liquid crystals, the liquid crystal shutters 200a and 200b are set to a closed state (a state in which no light is transmitted). Further, when the voltage is not applied to the transparent electrodes, the liquid crystal shutters 200a and 200b are configured to be in an open state (normally white). In the present embodiment, although the liquid crystal shutters 200a and 200b are used as shutters provided in the viewing glasses 200, the shutters are not limited to the liquid crystal shutters 200a and 200b. The shutters provided in the viewing glasses 200 may be mechanical shutters, for example, as long as the shutters can control light transmission and interception.

(4) Example of Image Writing and Backlight Driving

Figure 4:
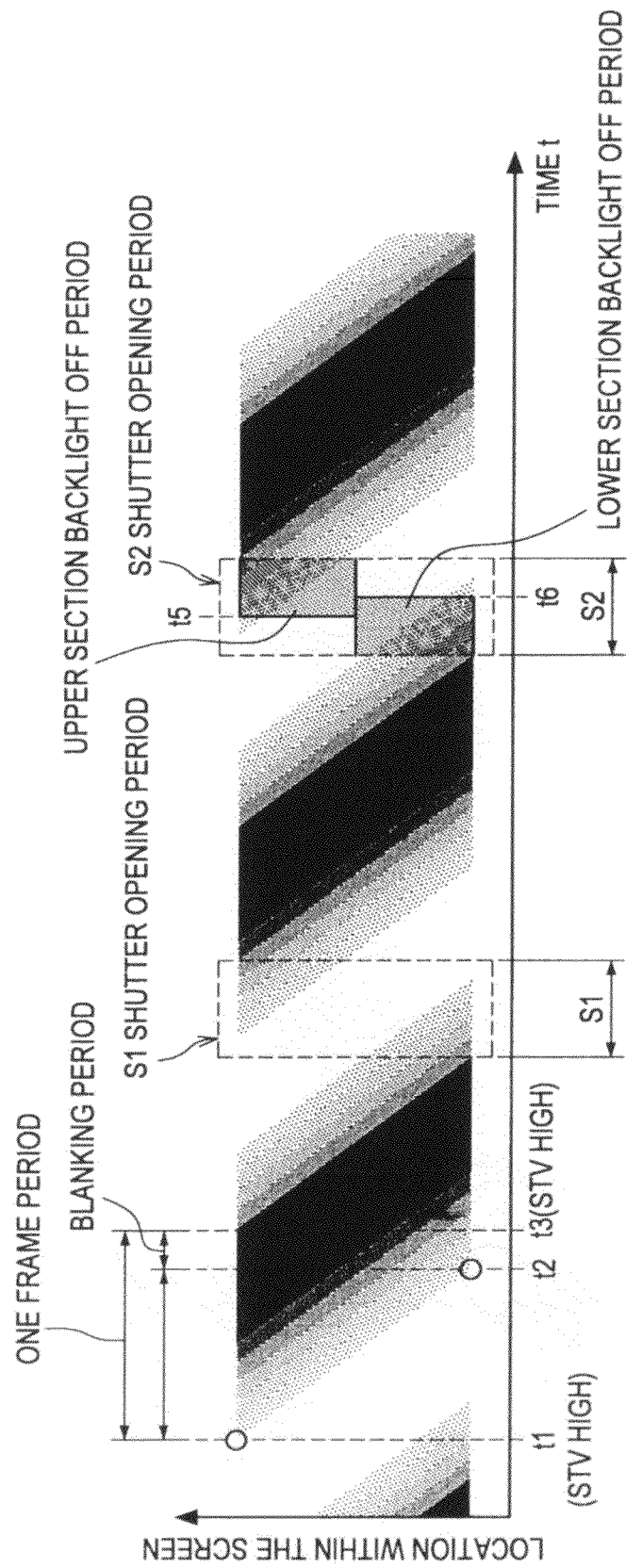
FIG. 4 is a schematic diagram that illustrates a driving principle relating to a system according to the first embodiment.

Next, with reference to FIG. 4, a driving principle of a system according to the present embodiment will be described. In FIG. 4, a horizontal axis represents time, and a vertical axis represents a location within the screen of the liquid crystal display panel 134 in an upward and downward direction. FIG. 4 is a schematic diagram that illustrates operations of respective portions, when a white display and a black display are alternately shown on the screen. Here, for example, it is assumed that the white display is the image L for the left eye and the black display is the image R for the right eye.

A timing t1 represents a start of a new frame period when the screen starts being rewritten from the white display to the black display, and is a timing at which a topmost line of the screen starts being changed into the black display. One frame period described here is 1/120 Hz=8.3 ms for both eyes in total, when a video image for one eye is set at 60 Hz in the stereoscopic display, for example.

A timing t2 represents a timing at which a bottommost line of the screen is being scanned after the scanning is performed sequentially line by line toward the bottom side of the screen. In the case of FIG. 4, at the timing of the timing t2, although the upper half of the screen has reached the eventual black display, the lower half of the screen is in a state of changing from the white display to the black display, thus showing a display in which the liquid crystal is in the middle of responding.

A timing t3 represents an end of one frame period, and it is a timing at which a blanking period following the timing t2 has elapsed. Further, the timing t3 is a timing at which a next one frame period starts.

The liquid crystal shutters 200a and 200b are normally in an open state during a period when a wider area of a display screen of the liquid crystal display panel 134 is either in the white display or in the black display. In an example shown in FIG. 4, in the case of the white display (the image L for the left eye), for example, a period S1 corresponds to the open state, for example. When the liquid crystal shutter 200b for the left eye is opened during the shutter opening period S1 shown in FIG. 4, although a middle section of the screen is already rewritten into an eventual target color, namely, the white display, the upper section of the screen is starting being changed into a next image R for the right eye (black display), and the lower section of the screen is showing an image in which a previous image R for the right eye (black display) is in the middle of changing into the image L for the left eye (white display). As a result, during the period S1, although a good image L for the left eye is obtained in the middle section of the screen, in the upper and lower sections of the screen, an image which is in the middle of changing into a next frame or an image which is in the middle of changing from a previous frame is displayed.

Therefore, in the present embodiment, it is made possible to obtain a good image over the full screen by controlling lighting of the backlight 136 for the upper and lower sections of the screen during the opening period of the liquid crystal shutters 200a and 200b. More specifically, the backlight 136 is lit when a response of the liquid crystal is completed, and in a transitional period to a next screen when the liquid crystal is in the middle of responding, the backlight 136 is turned off. In this way, the user cannot visually perceive an image displayed on the screen for which the liquid crystal is in the middle of responding, since the backlight 136 is turned off during this period, and the user can perceive only an image for which the liquid crystal response is complete. As a result, it is possible to improve display quality significantly.

Describing in more detail below, a shutter opening period S2 in FIG. 4 shows a lighting control method of the backlight 136 according to the present embodiment. During the shutter opening period S2 shown in FIG. 4, a dotted area represents a period when the backlight 136 is turned off (OFF), and a remaining area (white background area) is a period when the backlight 136 is lit. In the upper section of the screen, although the backlight 136 is lit from a start of the shutter opening period S2, the backlight 136 is turned off at a timing (timing t5) when the screen starts being rewritten into an image of the next frame (image R for the right eye).

At this time, as described with reference to FIG. 3, since the light source 150a mostly irradiates the upper half of the screen, it is possible to exclusively control the lighting and turning off of the upper section of the screen (upper half of the screen) by controlling a lighting state of the light source 150a for the upper section of the screen. More specifically, the light source 150a is lit at the start of the shutter opening period S2, and the light source 150a is turned off at and after the timing t5. In this way, it is possible to control the lighting state of the backlight 136 for the upper section of the screen during the shutter opening period S2.

Then, by turning off the light source 150a at and after the timing t5, a state in which the screen is in the middle of being rewritten (the transitional period when the liquid crystal is in the middle of responding) is not displayed on the upper section of the screen, and an image in the middle of being rewritten is not visually perceived by the user. Therefore, it is possible to obtain a good display quality.

On the other hand, in the lower section of the screen, the backlight 136 is turned off at the start of the shutter opening period S2, and the backlight 136 is lit when the rewriting of the full screen is completed (timing t6). Also, in this case, since the light source 150b for the lower section of the screen mostly irradiates the lower half of the screen, it is possible to control the lighting and turning off of the lower section of the screen (lower half of the screen) during the shutter opening period S2 by controlling a lighting state of the light source 150b for the lower section of the screen.

Therefore, by turning off the light source 150b in the lower section of the screen before and at the timing t6 through controlling the lighting and turning off of the light source 150b in the lower section of the screen, the state in which the screen is in the middle of being rewritten (the transitional period when the liquid crystal is in the middle of responding) is not displayed on the lower section of the screen either. Hence, the image in the middle of being rewritten is not visually perceived by the user, and it becomes possible to obtain the good display quality. As described above, by controlling the lighting and turning off of the backlight 136 both in the upper section and lower section of the screen, it becomes possible to obtain the good display quality over the full screen.

Note that, although the opening period S2 of the liquid crystal shutter 200b at a time when the image L for the left eye (white image) is displayed and the lighting and turning off of the backlight 136 during the period are described above with reference to FIG. 4, similar operations are also performed with respect to the opening period of the liquid crystal shutter 200a at a time when the image R for the right eye (black image) is displayed and to the control of the backlight 136 during the period. In this way, it is possible to improve the display quality of both the left and right video images.

(5) Example of Canceling Differences in Response Speed of Respective Colors when Driving Backlight When driving of the backlight 136 as illustrated in FIG. 4 is performed, in the upper section of the screen, only a timing when luminance of the backlight 136 starts decreasing is included in the shutter opening period S2, since the backlight 136 is turned off at the timing t5. Further, in the lower section of the screen, only a timing when the luminance of the backlight 136 starts increasing is included within the shutter opening period S2, since the backlight 136 is lit at the timing t6. In this case, if response speeds of respective RGB colors are identical both when the luminance of the backlight 136 starts increasing and when it starts decreasing, a coloration visually perceived by the left eye or the right eye of the user does not change from an original coloration of the image. On the other hand, if the response speeds of the respective RGB colors differ when the luminance of the backlight 136 starts increasing and when it starts decreasing, based on characteristics of a fluorescent material of the light sources 150a and 150b etc., it is assumed that the coloration changes. Therefore, as shown in FIG. 5, in the upper section and the lower section of the screen, an opposite operation to the luminance increase or the luminance decrease may be included within the shutter opening period S2 respectively.

Figure 5:
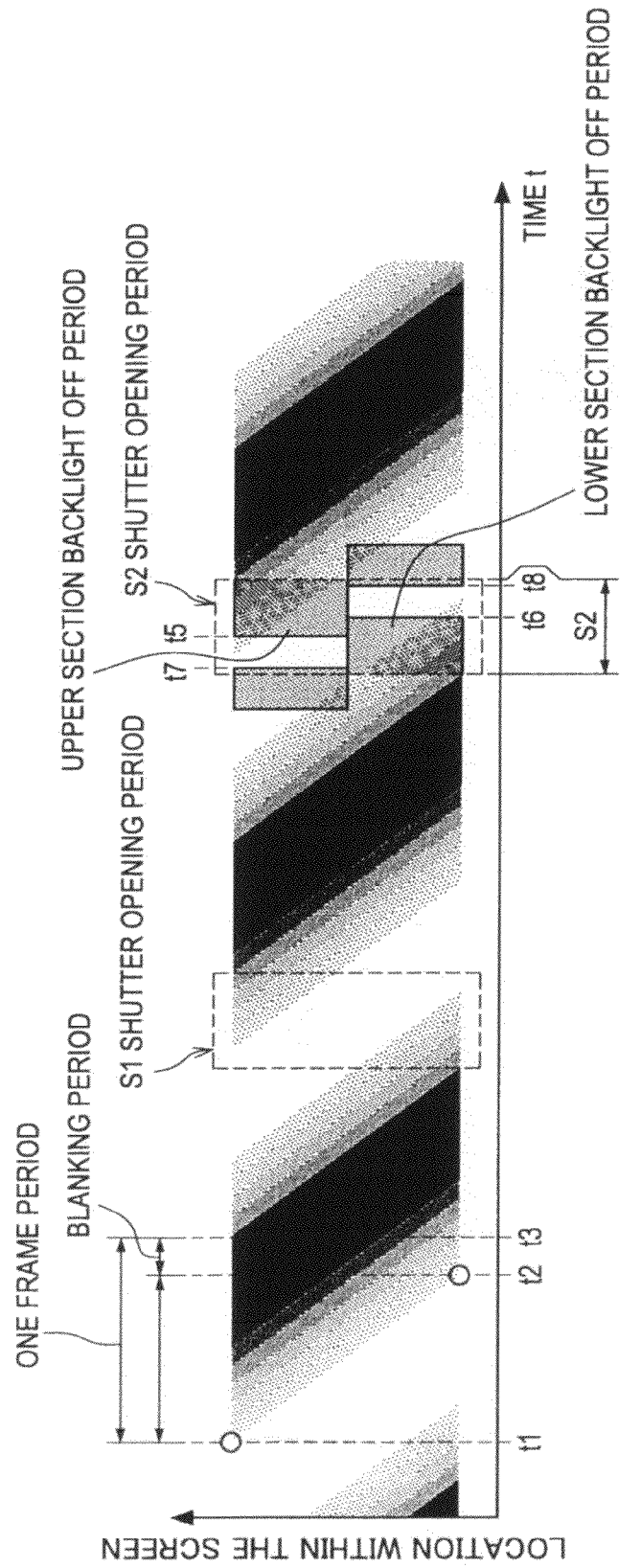
FIG. 5 is a schematic diagram that shows an example of respective operations in which luminance starts increasing and decreasing in an upper section and a lower section of a screen during a shutter opening period S2.

In an example shown in FIG. 5, the lighting and turning off of the backlight 136 is controlled such that, in the upper section of the screen, both a timing at which the luminance starts increasing (timing t7) and the timing at which the luminance starts decreasing (timing t5) are included within the shutter opening period S2. In more detail, with respect to the upper section of the screen, the backlight 136 is kept turned off until immediately after the start of the shutter opening period S2 (immediately after the liquid crystal shutter 200b is opened), and the backlight 136 is lit at the timing t7, namely, immediately after the start of the shutter opening period S2. After that, in a similar manner as illustrated in FIG. 4, the backlight 136 is turned off at the timing t5.

Further, in the lower section of the screen, the lighting and turning off of the backlight 136 is controlled such that the timing at which the luminance starts increasing (timing t6) and a timing at which the luminance starts decreasing (timing t8) are included within the shutter opening period S2. In more detail, with respect to the lower section of the screen, after the backlight 136 is lit at the timing t6 in a similar manner as illustrated in FIG. 4, the backlight 136 is turned off just before the shutter opening period S2 ends (just before the liquid crystal shutter 200b is closed).

In this way, with respect to both the upper section of the screen and the lower section of the screen, both the start of luminance increase and the start of luminance decrease are included within the shutter opening period S2, and as a result, even when the response speeds of the respective RGB colors are not identical, it is possible to prevent the user from visually perceiving the change of the coloration.

(6) Timing Chart Regarding Control of Shutters and Backlight

Figure 6:
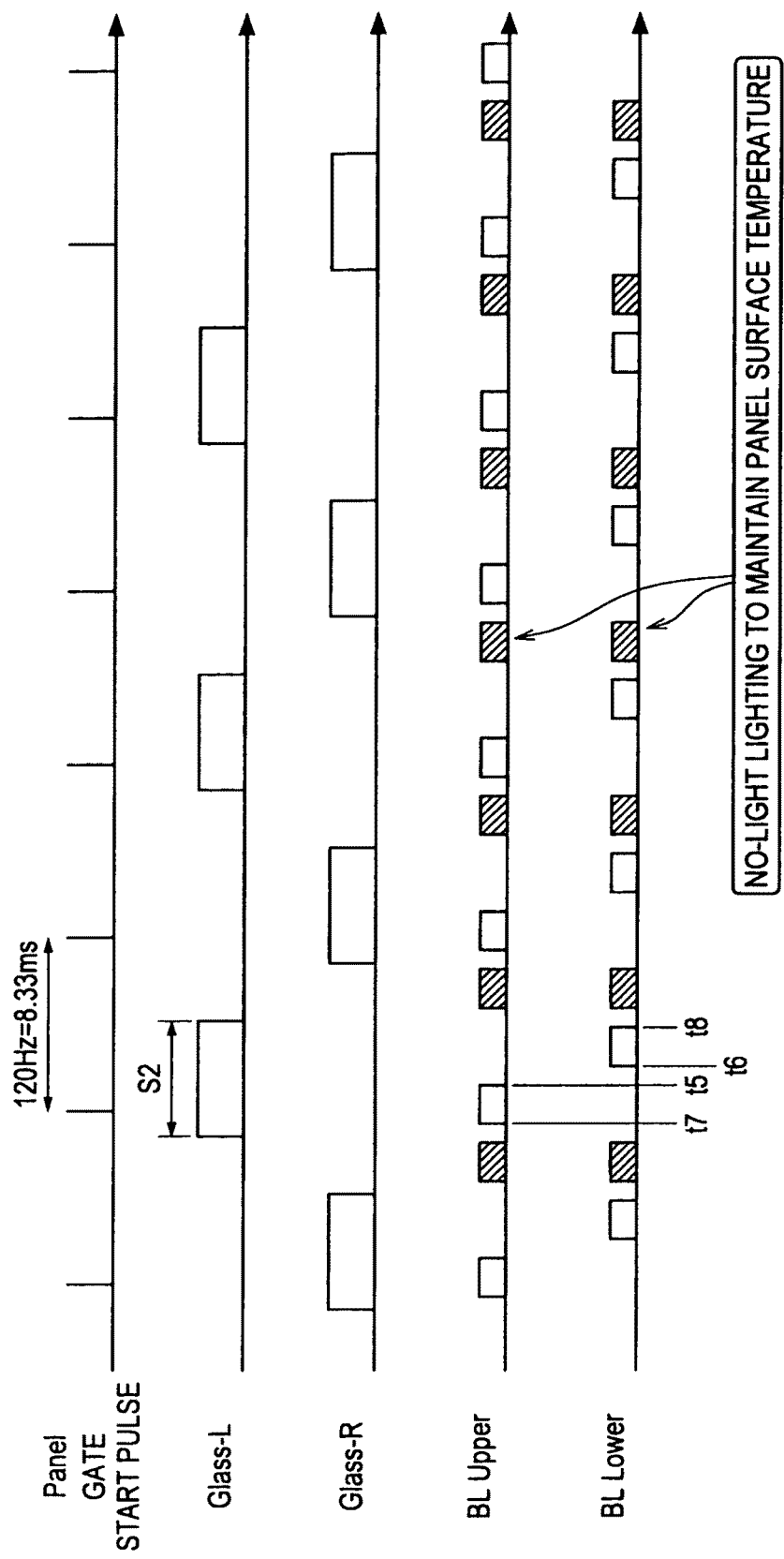
FIG. 6 is a timing chart that shows rewriting timings of an image, opening and closing states of liquid crystal shutters, a lighting state of a light source for the upper section of the screen and a lighting state of a light source for the lower section of the screen.

FIG. 6 is a timing chart that shows rewriting timings (gate start pulse) of the image L for the left eye and the image R for the right eye in the image display device 100, opening and closing states of the liquid crystal shutter 200a (Glass-R) and the liquid crystal shutter 200b (Glass-L), the lighting state of the light source 150a (BL Upper) of the backlight 136 for the upper section of the screen and the lighting state of the light source 150b (BL Lower) of the backlight 136 for the lower section of the screen.

In FIG. 6, a timing when the gate start pulse becomes high corresponds to the timing t1 shown in FIG. 4 and FIG. 5, and at this timing, an image for the next frame starts being written in the upper section of the screen. Further, the liquid crystal shutter 200a opens during a period when a Glass-R signal becomes high, and the liquid crystal shutter 200b opens during a period when a Glass-L signal becomes high. In addition, the light source 150a for the upper section of the screen is lit during a period when the BL Upper becomes high, and the light source 150b for the lower section of the screen is lit during a period when the BL Lower becomes low.

In FIG. 6, the image L for the left eye and the image R for the right eye are written alternately at the timing when the gate start pulse becomes high, and in synchronization with the timing, the liquid crystal shutters 200a and 200b are opened alternately. At this time, the liquid crystal shutters 200a and 200b are opened before or at the timing when the gate start pulse becomes high.

In an example shown in FIG. 6, control is performed such that both a timing when the backlight is lit and a timing when the backlight is turned off are included within the shutter opening period in a similar manner as described in FIG. 5. In a similar manner as in FIG. 4 and FIG. 5, as an example, the opening period S2 of the liquid crystal shutter 200b for the left eye during the display period of the image L for the left eye is described below. During the period S2 when the liquid crystal shutter 200b is open, at first, the light source 150a for the upper section of the screen is lit during a period between the timing t7 and the timing t5, to cause the backlight 136 of the upper half of the screen to emit light. After that, the light source 150b for the lower section of the screen is lit during a period between the timing t6 and the timing t8, to cause the backlight 136 of the lower half of the screen to emit light. In this way, it becomes possible to implement the driving illustrated in FIG. 5.

Further, in an example in FIG. 6, during an interval in which both the liquid crystal shutters 200a and 200b are closed, both the light sources 150a and 150b for the upper and lower sections of the screen are caused to emit light for a predetermined period at a similar timing to maintain a surface temperature of the liquid crystal display panel 134. In this way, it is possible to prevent the temperature of the liquid crystal display panel 134 from declining, and as a result, it is possible to prevent a response speed of the liquid crystal from slowing down due to a declining temperature. On the other hand, from a view point of electric power conservation, it is possible to minimize electric power consumption by turning off the backlight 136 during the interval when both the liquid crystal shutters 200a and 200b are closed.

As described above, according to the present embodiment, by turning on and off the backlight 136 during the shutter opening period, the image displayed during the period when the liquid crystal is in the middle of responding is not visually perceived by the user over the full screen, and as a result, it becomes possible to provide consistent images with a complete liquid crystal response using a low-cost system. Further, the light guide plate 152 is formed with only one sheet, and it is possible to control the lighting and turning off of the backlight 136 for the upper section and the lower section of the screen by controlling the upper and lower light sources 150a and 150b. As a result, it is possible to minimize the manufacturing costs. In addition, by performing both the lighting and turning off operations of the backlight 136 at least once during the shutter opening period S2, it is possible to suppress response speed variations caused by colors of the light sources 150a and 150b. As a result, it is possible to produce a consistent display.

2. Second Embodiment

Figure 7:
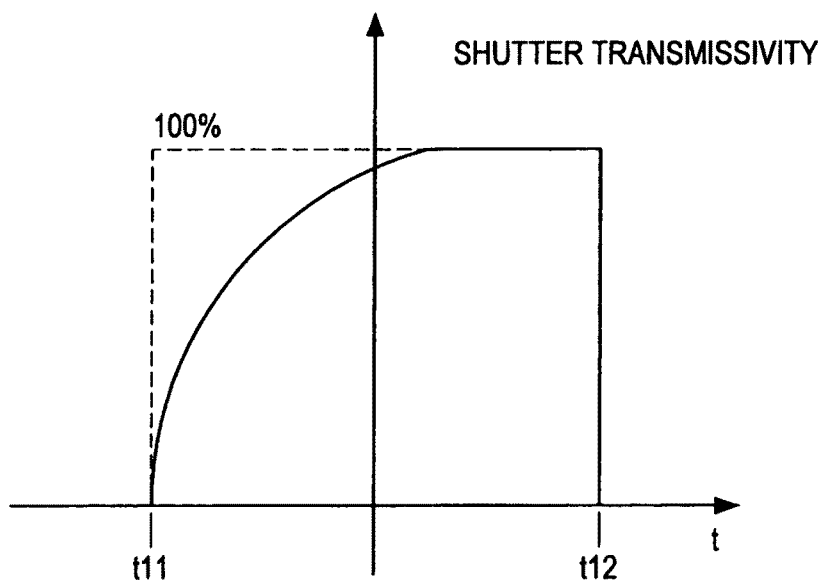
FIG. 7 shows temporal changes of a shutter transmissivity of glasses for viewing, a vertical axis representing the transmissivity and a horizontal axis representing time.

When liquid crystal such as a normally white mode, for example, is used as the liquid crystal shutters 200a and 200b of the viewing glasses 200, it takes a relatively longer time for the liquid crystal shutters to respond and transit from the closed state to the open state, and a transmissivity waveform becomes as shown in FIG. 7. FIG. 7 depicts temporal changes in transmissivity, a vertical axis representing the transmissivity and a horizontal axis representing time. As shown in FIG. 7, if the liquid crystal shutters 200a and 200b start opening at a timing t11, the transmissivity increases gradually according to response characteristics of the liquid crystal, and reaches 100% in line with a predetermined response delay. After that, the liquid crystal shutters 200a and 200b are closed at a timing t12.

As described above, the transmissivity is low when the liquid crystal shutters 200a and 200b start opening, and the transmissivity gradually increases as time passes. As a result, a characteristic waveform of the change in transmissivity as shown in FIG. 7 is obtained. When this type of shutters are used in combination with the above-described backlight 136, since the liquid crystal shutter 200b starts opening at a timing when the shutter opening period S2 starts, the shutter transmissivity becomes low during an effective light emission period in the upper section of the screen. On the other hand, in the lower section of the screen, since the liquid crystal shutter 200b is already fully open before the timing t6 when the backlight 136 is lit, the transmissivity is already reaching nearly 100%. Therefore, with respect to the lower section of the screen, lowering of the shutter transmissivity during the effective light emission period is avoided, the lowering of the shutter transmissivity being caused by the characteristics shown in FIG. 7. As a result, it is assumed that the luminance that reaches the user's eyes in the upper section of the screen becomes lower in comparison with that of the lower section of the screen.

Figure 8:
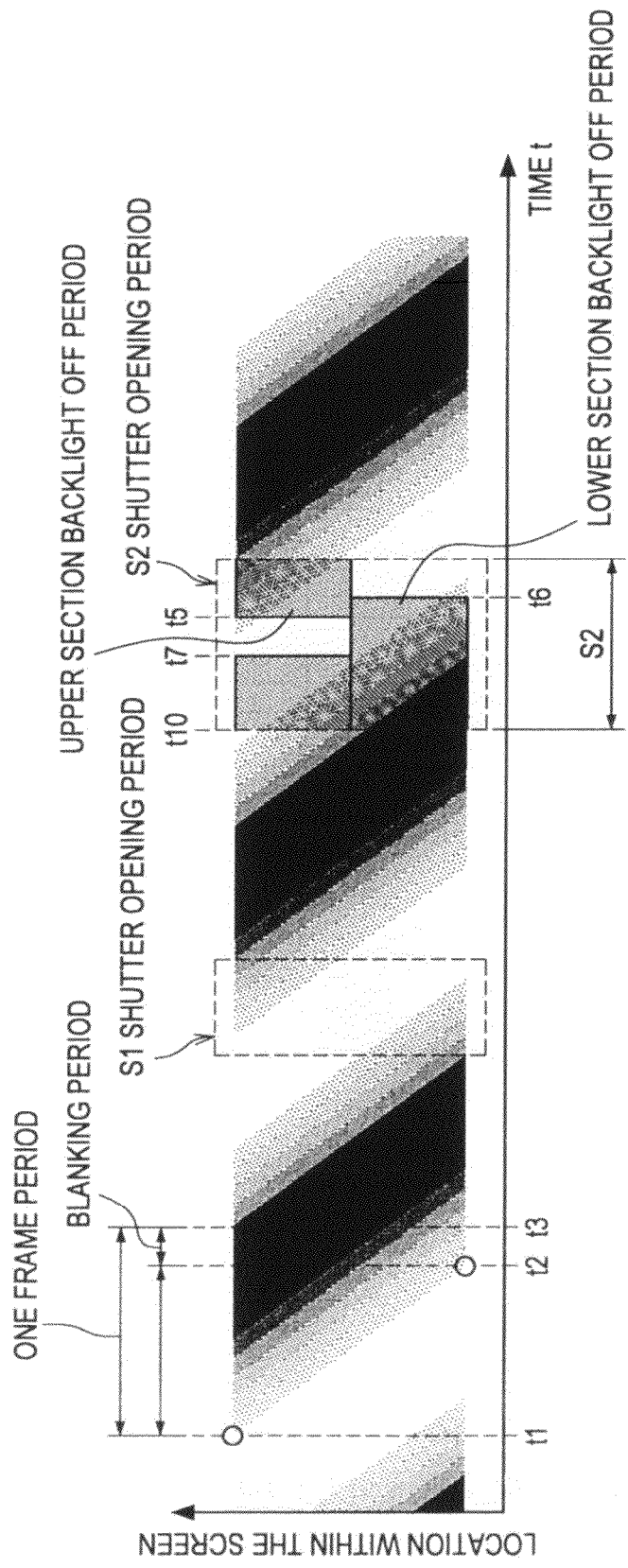
FIG. 8 is a schematic diagram that shows an example in which the shutter opening period S2 is extended in an earlier direction and the liquid crystal shutters open from a timing t10 which is substantially earlier than a timing t7.

Therefore, in the present embodiment, as shown in FIG. 8, the shutter opening period of the liquid crystal shutter 200b is extended in an earlier direction, and the liquid crystal shutter 200b is opened at a timing t10 that is sufficiently prior to the timing t7. In this way, during a transitional period when the transmissivity gradually increases as the liquid crystal shutter 200b starts opening, the backlight 136 is turned off both in the upper section and the lower section of the screen. By controlling the backlight 136 and the liquid crystal shutters 200a and 200b in this way, it is possible to actually display an image in a state of high transmissivity obtained after the liquid crystal shutter 200b is fully opened even in the upper section of the screen, and as a result, it is possible to avoid lowering of the luminance due to the response characteristics of the liquid crystal. Note that, although a description was given with respect to the liquid crystal shutter 200b for the left eye in FIG. 8, a similar control is performed for the liquid crystal shutter 200a for the right eye.

As described above, according to the second embodiment, by extending the opening period of the liquid crystal shutters 200a and 200b further in the earlier direction and turning off the backlight 136 during the extended period, the luminance of the screen can be improved during the opening period of the liquid crystal shutters 200a and 200b.

3. Third Embodiment

Figure 9:
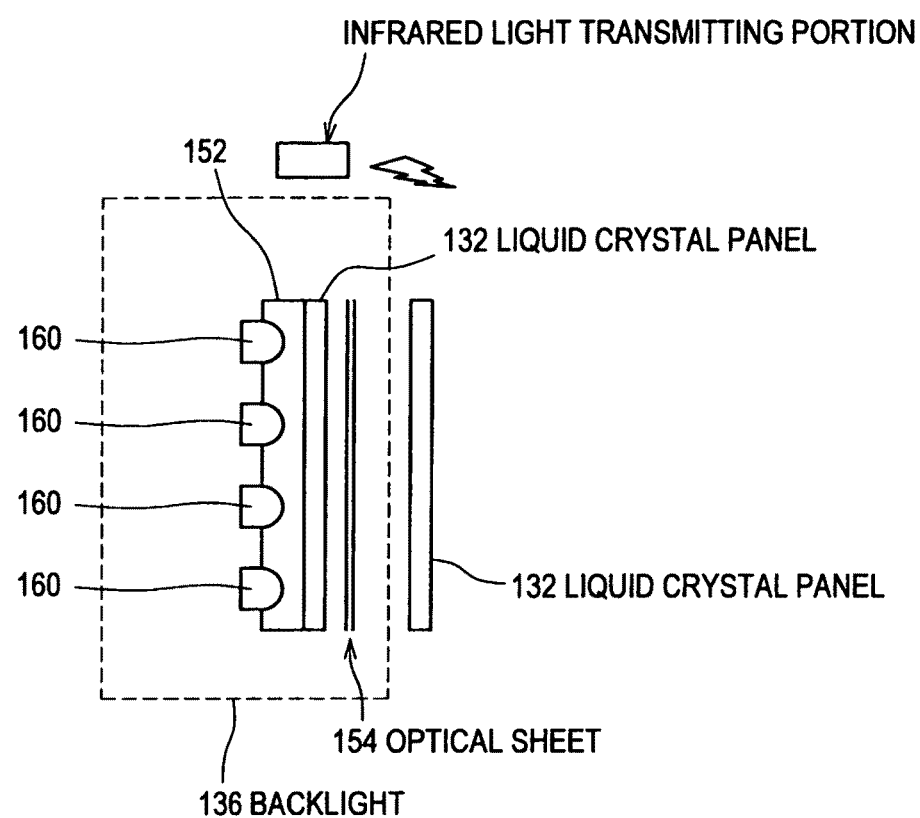
FIG. 9 is a schematic diagram that shows an example of a configuration for scan lighting of a backlight.

Although, in the above-described examples, the display screen is divided into two sections, namely, the upper section and the lower section of the screen, and the lighting and turning off timings of the backlight 136 are controlled for the upper section and the lower section of the screen respectively, the display screen may be divided into more than two sections and the backlight 136 may be successively scan lit from the upper section of the screen, the scan lighting starting at a timing when the liquid crystal display panel 134 completes responding. FIG. 9 is a schematic diagram that shows a configuration example for scan lighting of the backlight 136. In this case, the backlight 136 of a so-called direct type is used, in which a plurality of light sources 160 are arranged directly beneath the screen as shown in FIG. 9. In the backlight 136 shown in FIG. 9, in order to inhibit the light guide plate 152 from emitting light locally, a diffuser plate is provided on a front surface of the light guide plate 152. When this kind of direct type backlight 136 is used, since it is not only possible to divide the screen into the upper half and the bottom half of the screen, but also to divide the screen into a plurality of sections in the vertical direction, it becomes possible to perform more detailed control.

Figure 10:
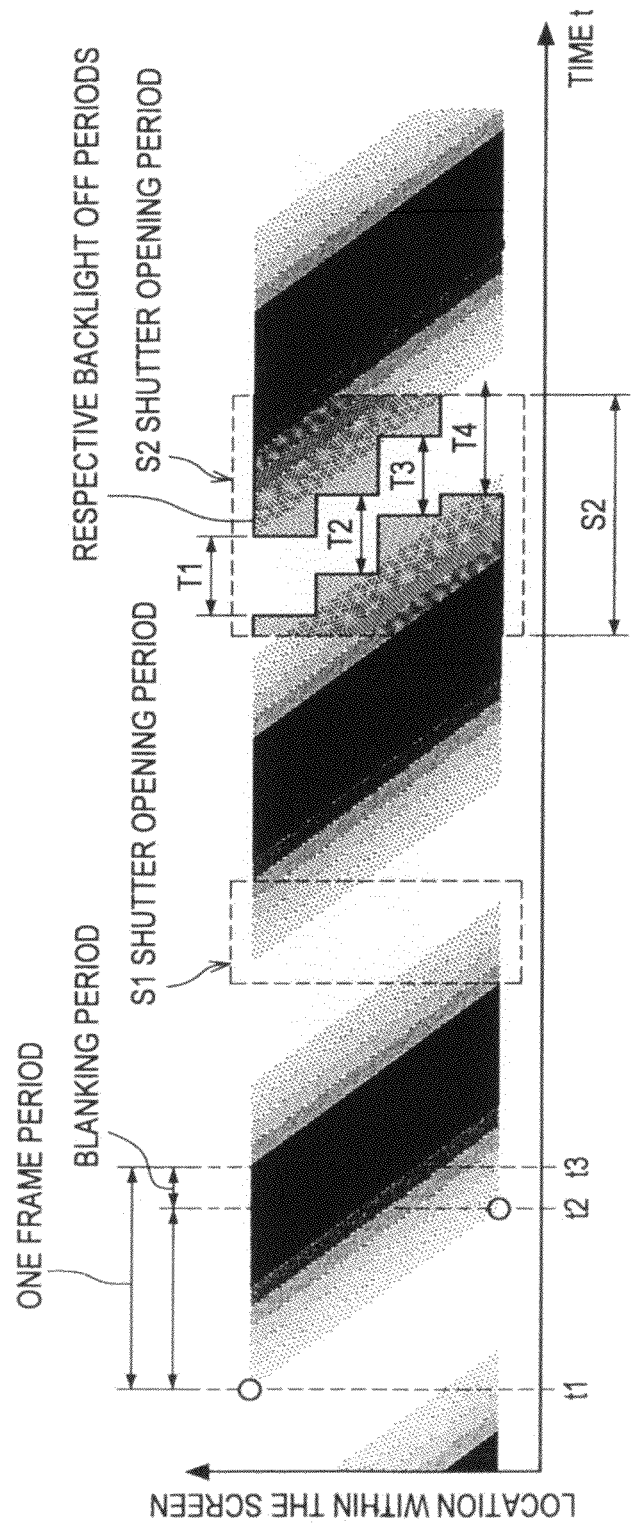
FIG. 10 is a schematic diagram that shows a control method of the shutters and the backlight, when the backlight shown in FIG. 9 is used.

FIG. 10 is a schematic diagram that shows a control method of the shutters 200a and 200b and the backlight 136, when the backlight 136 shown in FIG. 9 is used. In the examples shown in FIG. 9 and FIG. 10, since four of the light sources 160 are arranged in the vertical direction, the light emitting area of the backlight 136 is divided into four sections on the screen. Therefore, during the opening period S2 of the liquid crystal shutter 200b, the four light sources 160 successively blink, starting from the top light source (T1, T2, T3 and T4), such that the user only sees the moments when the screen is most stable.

By performing this kind of scan lighting, it becomes possible to turn off the backlight 136 only in areas on which are displayed images for which the liquid crystal is in the middle of responding, and it is possible to reliably suppress a case in which an image with a completed liquid crystal response is not visually perceived by the user due to the backlight 136 being turned off. Therefore, during the opening period S2, it becomes possible to minimize the lowering of the luminance caused by the turning off of the backlight 136.

Note that, in the above description, although the description was given using the direct type backlight 136, as long as the lighting state can be controlled with the screen divided into a plurality of areas, the configuration is not limited to one with the direct type backlight. This type of backlight can be formed with a plurality of small edge light type backlights arranged within the screen, for example, as well as with the direct type backlight.

As described above, according to the third embodiment, by dividing the screen into a plurality of areas, it is possible to perform more accurate control, and it becomes possible to turn off the backlight 136 only in the areas to which the liquid crystal has not yet responded during the shutter opening period. As a result, it is possible to improve the luminance of the screen visually perceived by the user during the shutter opening period.

Figure 11:
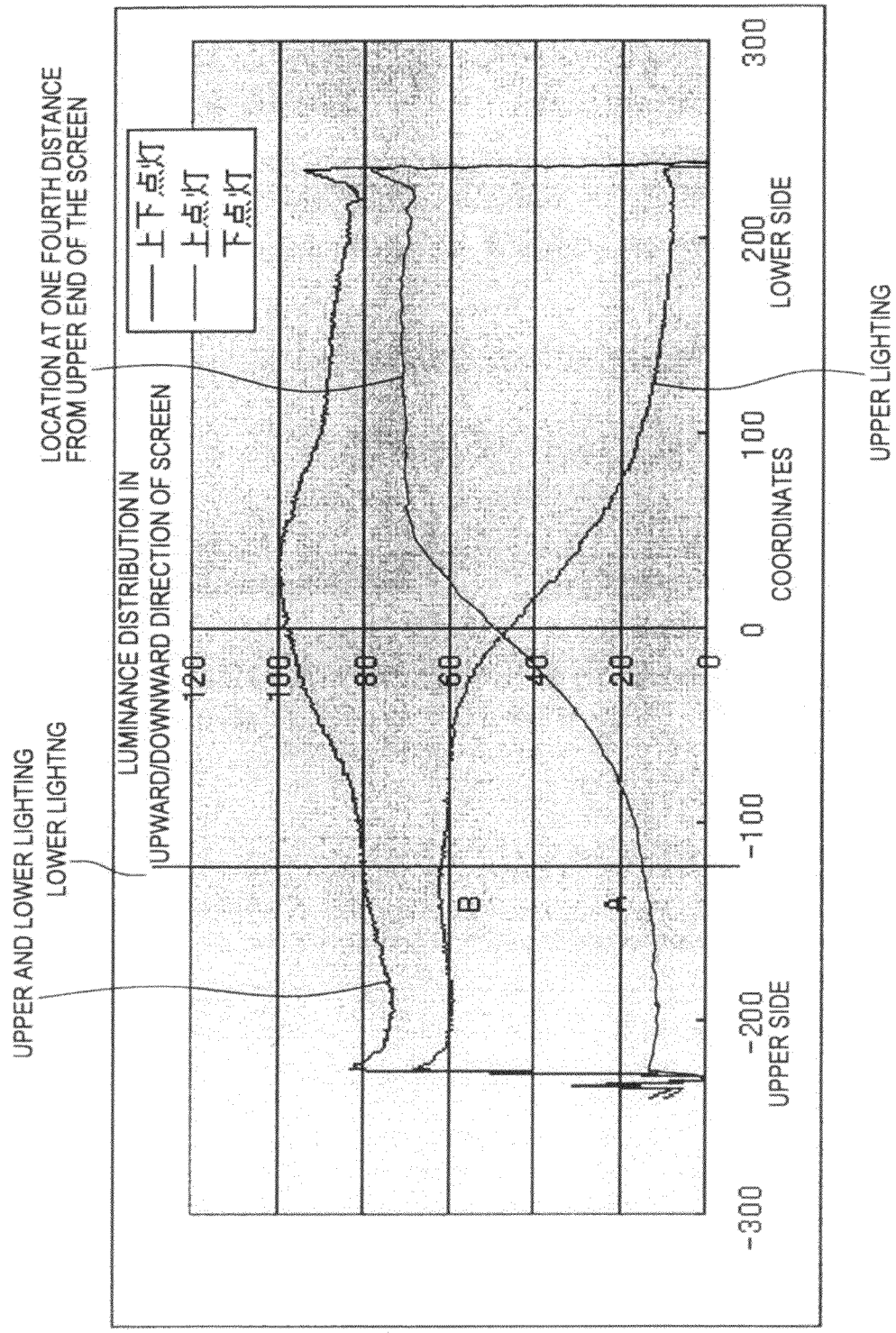
FIG. 11 is a characteristic diagram that shows the luminance (vertical axis) with respect to a location in an upward and downward direction on the screen (horizontal axis), when both upper and lower light sources are lit, when only the upper light source is lit and when only the lower light source is lit, respectively.

FIG. 11 is a characteristic diagram that shows the luminance (vertical axis) with respect to a location in an upward and downward direction on the screen (horizontal axis), respectively, when both the light sources 150a and 150b are lit (upper and lower lighting), when only the light source 150a is lit (upper lighting) and when only the light source 150b is lit (lower lighting). In an example shown in FIG. 11, when only the upper light source 150a is lit, the luminance at a point located one-fourth in the downward direction from the upper end of the screen is approximately 60, and the luminance at the same point is approximately 15 when only the lower light source 150b is lit, with a luminance ratio between the former and the latter being ¼. In this way, if the luminance ratio at the point located one-fourth in the downward direction from the upper end of the screen is equal to or lower than ¼, an amount of light emitted from the lower light source 150b, which penetrates into an upper half area, is sufficiently reduced. Then, when the lower light source 150b is caused to emit light, it is possible to prevent the user from visually perceiving a video image in the upper half of the screen, to which the liquid crystal is in the middle of responding. As a result, it is possible to improve the display quality. On the other hand, if the luminance ratio at the point located one-fourth in the downward direction from the upper end of the screen becomes greater than ¼, when the lower light source 150b is caused to emit light, the video image in the upper half of the screen, to which the liquid crystal is in the middle of responding, is visually perceived by the user, thus resulting in a deterioration in the display quality. Therefore, when the light source 150a or the light source 150b is caused to emit light respectively, by keeping the luminance ratio at the point located one-fourth in the downward or upward direction from either the upper or the lower end of the screen equal to or lower than ¼, it is possible to secure the display quality.

4. Fourth Embodiment

Figure 12:
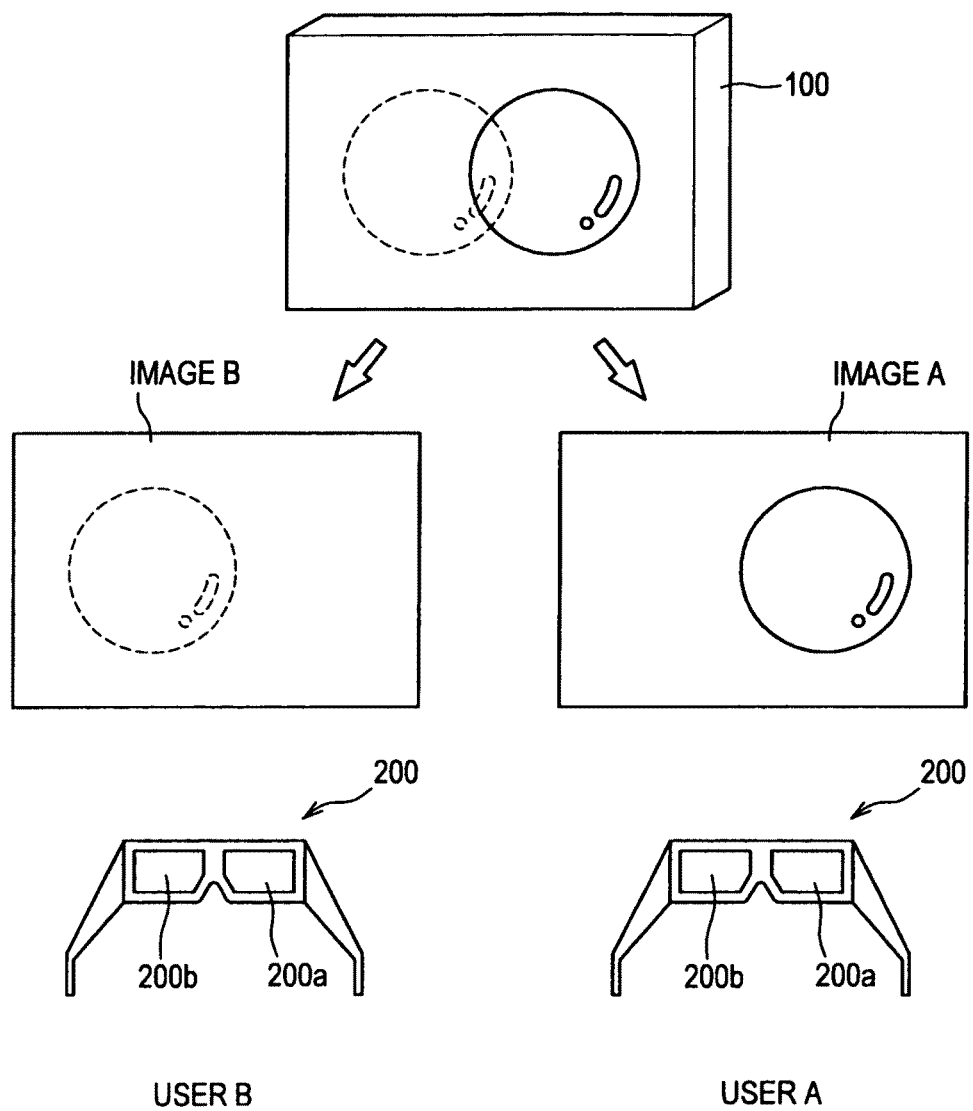
FIG. 12 is a schematic diagram that shows a system (Dual View) that provides different video images for a plurality of users.

In the above-described examples, although a stereoscopic image display viewing system is used as an example, it is possible for the present invention to be applied to a system that provides different video images for a plurality of users. FIG. 12 is a schematic diagram that shows a system (Dual View) that provides different video images for a plurality of users. In this system, the liquid crystal shutters 200a and 200b of the viewing glasses 200 perform the opening and closing operation at similar timings. The image display device 100 is a time-division display device, for example, and it displays alternately a video image for a user A and a video image for a user B on the full screen at very short intervals.

In this case, it is assumed that two images, namely, an image A for the user A and an image B for the user B, are displayed on the image display device 100, and among two users, one user, namely the user A, visually perceives the image A and the other user, namely the user B, visually perceives the image B. Further, it is assumed that the video images that are displayed are sourced from a 60 Hz NTSC system.

The liquid crystal shutters 200a and 200b perform the opening and closing operation in synchronization with image switching that is performed for each field of the image display device 100. More specifically, with reference to FIG. 12, assuming that the image A is the image for the user A and the image B is the image for the user B, both the liquid crystal shutters 200a and 200b of the viewing glasses 200 worn by the user A are set to the open state in a field in which the image A is displayed on the image display device 100. On the other hand, both the liquid crystal shutters 200a and 200b of the viewing glasses 200 worn by the user B are set to the closed state in that field.

For example, when it is assumed that the white display in FIG. 4 is the image A for the user A and the black display in FIG. 4 is the image B for the user B, in FIG. 4, at first, the image A starts being displayed on the image display device 100, and both the liquid crystal shutters 200a and 200b are set to the open state during the shutter opening period S2. In this way, the user A can visually perceive the image A, namely, the white display.

Next, when the image B, namely, the black display starts being displayed on the image display device 100, both the liquid crystal shutters of the user A are set to the closed state, and transmission of the image B is blocked with respect to the liquid crystal shutters 200a and 200b of the user A.

Further, in a field in which the image B for the user B is displayed on the image display device 100, both the liquid crystal shutters 200a and 200b of the viewing glasses 200 worn by the user B are set to the open state. On the other hand, both the liquid crystal shutters 200a and 200b of the viewing glasses 200 worn by the user A are set to the closed state in that field.

Namely, when the image B is fully displayed, since both the liquid crystal shutters 200a and 200b of the user B are set to the open state, the user B can perceive the image B. On the other hand, since both the liquid crystal shutters 200a and 200b of the viewing glasses 200 worn by the user A are set to the closed state, the user A cannot perceive the image B.

As described above, the image display device 100 alternately displays the image A for the user A and the image B for the user B on the full screen at very short intervals, and opens and closes the liquid crystal shutters of the respective users in synchronization with the display timings of the image A and the image B. In this way, it is possible to provide the different images for the user A and the user B.

Note that in FIG. 9, although a case in which the number of users is two is described as an example, a similar configuration can be used even when there are more than two users. The image display device 100 can provide n (n is a natural number) kinds of different images for a plurality (=n) of users by displaying the n kinds of images in a time-division manner. In this case, by opening both the liquid crystal shutters 200a and 200b of the viewing glasses 200 for a target user, who is provided with a chosen image at a timing when the chosen image is displayed among the n kinds of images, it is possible to make only the target user visually perceive the chosen image. In this case, in order to provide the n kinds of images for a plurality of users, it is preferable to drive the display at a frequency equal to or greater than (60×n) Hz.

A basic configuration of the image display device 100 in the system shown in FIG. 12 is similar to that of FIG. 2. The video signal control portion 120 functions so as to control video signals for a plurality of users, and video signals for displaying the image A and the image B are input into the video signal control portion 120. The video signal control portion 120 alternately outputs the video signals for the image A and the image B, such that the image A and the image B are alternately displayed on the liquid crystal display panel 134.

The video signal of the image A and the video signal of the image B that are converted by the video signal control portion 120 are input into the timing control portion 126. The timing control portion 126 converts the input video signals into signals to be input into the liquid crystal display panel 134, and generates the pulse signals to be used for the operations of the gate driver 130 and the data driver 132.

Further, the video signal control portion 120 transmits to the shutter control portion 122 a timing signal that indicates the switching timings of the video signals of the image A and the image B. Based on the timing signal transmitted from the video signal control portion 120, the shutter control portion 122 transmits to the emitter 124 a driving signal that causes the emitter 124 to emit light. Here, the driving signal that causes the emitter 124 to emit light can include the opening and closing timings of the liquid crystal shutters 200a and 200b corresponding to individual users. The shutter control portion 122 controls the opening and closing timings of the liquid crystal shutters 200a and 200b based on the timing signal transmitted from the video signal control portion 120. Based on the driving signal transmitted from the shutter control portion 122, the emitter 124 transmits to the viewing glasses 200 an optical signal that indicates the opening and closing timings of the left and right liquid crystal shutters 200a and 200b. Further, the shutter control portion 122 transmits to the backlight control portion 128 the timing signal that indicates the switching timings of the image A and the image B.

Then, also with respect to the configuration shown in FIG. 12, by controlling the backlight 136 during the shutter opening period S2 in a similar manner to the first, second and third embodiments when the image A or the image B is displayed, it is possible to prevent the user from visually perceiving the image of the transitional period when the liquid crystal is in the middle of responding when switching between the image A and the image B.

The exemplary embodiments of the present invention are described in detail above with reference to the appended drawings. However, the present invention is not limited to the above-described examples. It should be understood by those skilled in the art that various modifications, combinations, sub-combinations and alterations may occur depending on design requirements and other factors insofar as they are within the scope of the appended claims or the equivalents thereof.

What is claimed is:

1. An image display device comprising:
a display panel configured to periodically display a plurality of different images;
a shutter control portion configured to generate timing signals for driving a right eye and a left eye shutters of a pair of viewing glasses, in synchronization with the periodical display of the display panel, the glasses being provided with the shutters for the right eye and the left eye;
a backlight configured to include light sources and to irradiate the display panel from a rear side of the display panel; and
a backlight control portion configured to control the backlight so as to cause different parts of light sources of the backlight to light at different timings during an opening period of the shutters.

2. The image display device according to claim 1, wherein said backlight is configured to include a light guide plate of a size corresponding to a display area of the display panel and light sources that are provided on two opposing sides.

3. The image display device according to claim 1, wherein, during the opening period of the shutters, the shutter control portion generates the timing signals for opening the shutters before the backlight opens.

4. An image display viewing system comprising:
an image display device that includes
a display panel configured to periodically display a plurality of different images,
a shutter control portion configured to generate timing signals for driving shutters for a right eye and a left eye, in synchronization with the periodical display of the display panel, a backlight configured to include light sources and to irradiate the display panel from a rear side of the display panel, and a backlight control portion configured to control the backlight so as to cause different parts of the light sources of the backlight to blink at different timings during an opening period of the shutters; and stereoscopic image viewing glasses that are provided with the shutters for the right eye and the left eye and open and close the shutters for the right eye and the left eye based on the timing signals.

5. The image display viewing system according to claim 4,
wherein the shutters of the glasses for viewing images are arranged in front of the right eye and the left eye of a viewer respectively; and wherein, in response to switching between an image for the right eye and an image for the left eye that are periodically output from the image display device, the shutters are opened and closed to cause the image for the right eye to be incident to the right eye and to cause the image for the left eye to be incident to the left eye.

6. The image display viewing system according to claim 4,
wherein the shutters of the glasses for viewing images are arranged in front of the right eye and the left eye of the viewer respectively; and wherein, in response to switching between a plurality of different images that are periodically output from the image display device, the shutters are opened and closed to cause one of the images to be incident to both the right eye and the left eye.

7. An image display method, comprising the steps of:
displaying a plurality of different images periodically;
generating timing signals for driving shutters for a right eye and a left eye, in synchronization with the periodical display of a display panel, with respect to glasses for viewing images, the glasses being provided with the shutters for the right eye and the left eye; and controlling a backlight configured to include light sources and to irradiate the display panel from a rear side of the display panel so as to cause different parts of the light sources of the backlight to light at different timings during an opening period of the shutters.

8. The image display device according to claim 1, wherein a part of the light source(s) is/are configured to be turned off when a screen is configured to be written into an image of a next frame.

9. The image display device according to claim 8, wherein another part of the light source(s) is/are configured to light when writing of a full screen is completed.

10. The image display device according to claim 8, wherein a part of the light source(s) is/are configured to be kept turned off after a start of a shutter opening period and another part of the light source(s) is/are configured to be turned off before an end of the shutter opening period.

11. The image display device according to claim 1,
in which said backlight is further configured to include a light guide plate, in which the light sources of the backlight include a first light source and a second light source which are arranged within the backlight such that the first light source is positioned adjacent one side of the light guide plate and the second light source is positioned adjacent an opposite side of the light guide plate, and in which the backlight control portion controls the backlight so as to cause the first light source and the second light source of the backlight to light at different timings so as to cause only a first portion of the backlight to emit light when the first light source is lit and to cause only a second portion of the backlight which is different from the first portion thereof to emit light when the second light source is lit.

* * * * *